(12) United States Patent
Hviid et al.

(10) Patent No.: US 10,203,773 B2
(45) Date of Patent: Feb. 12, 2019

(54) INTERACTIVE PRODUCT PACKAGING SYSTEM AND METHOD

(71) Applicant: BRAGI GmbH, München (DE)

(72) Inventors: Nikolaj Hviid, München (DE); Arne D. Loermann, München (DE); Matthias Lackus, München (DE)

(73) Assignee: BRAGI GmbH, München (DE)

( * ) Notice: Subject to any disclaimer, the term of this patent is extended or adjusted under 35 U.S.C. 154(b) by 143 days.

(21) Appl. No.: 15/244,995

(22) Filed: Aug. 23, 2016

(65) Prior Publication Data

US 2017/0060262 A1 Mar. 2, 2017

Related U.S. Application Data

(60) Provisional application No. 62/211,740, filed on Aug. 29, 2015.

(51) Int. Cl.
| | |
|---|---|
| *G06F 3/03* | (2006.01) |
| *B65D 85/00* | (2006.01) |
| *B65D 77/00* | (2006.01) |
| *B65D 25/54* | (2006.01) |
| *B65D 77/22* | (2006.01) |
| *G09F 23/02* | (2006.01) |
| *G09F 23/10* | (2006.01) |

(Continued)

(52) U.S. Cl.
CPC .............. *G06F 3/03* (2013.01); *B65D 25/54* (2013.01); *B65D 77/006* (2013.01); *B65D 77/22* (2013.01); *B65D 85/70* (2013.01); *G09F 23/02* (2013.01); *G09F 23/10* (2013.01); *G09F 27/00* (2013.01); *G09F 2023/0025* (2013.01); *H04R 1/025* (2013.01); *H04R 2420/07* (2013.01)

(58) Field of Classification Search
CPC .......... B65D 5/54; B65D 77/06; B65D 77/22; B65D 85/70; B65D 25/54; B65D 77/006; B65D 85/00; G09F 27/00; G09F 23/00; G09F 23/02; G09F 23/10; G09F 2003/0216; G06F 3/03
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

International Search Report & Written Opinion, PCT/EP16/70233 (dated Oct. 21, 2016).

(Continued)

*Primary Examiner* — Sardis F Azongha

(74) *Attorney, Agent, or Firm* — Goodhue, Coleman & Owens, P.C.

(57) ABSTRACT

A packaging system and method for providing information through a packaging system. A cover page of the packaging system is displayed. A determination of a page accessed with the packaging system is made. A display action associated with the page of the packaging system is performed in response to a user turning to the next page.

17 Claims, 7 Drawing Sheets

(51) Int. Cl.
*G09F 27/00* (2006.01)
*H04R 1/02* (2006.01)
*G09F 23/00* (2006.01)

(56) References Cited

U.S. PATENT DOCUMENTS

| | | | |
|---|---|---|---|
| 4,334,315 A | | 6/1982 | Ono et al. |
| 4,375,016 A | | 2/1983 | Harada |
| 4,588,867 A | | 5/1986 | Konomi |
| 4,654,883 A | | 3/1987 | Iwata |
| 4,682,180 A | | 7/1987 | Gans |
| 4,791,673 A | | 12/1988 | Schreiber |
| 4,855,725 A | * | 8/1989 | Fernandez .............. G06F 3/147 345/173 |
| 4,865,044 A | | 9/1989 | Wallace et al. |
| 5,191,602 A | | 3/1993 | Regen et al. |
| 5,201,007 A | | 4/1993 | Ward et al. |
| 5,280,524 A | | 1/1994 | Norris |
| 5,295,193 A | | 3/1994 | Ono |
| 5,298,692 A | | 3/1994 | Ikeda et al. |
| 5,343,532 A | | 8/1994 | Shugart |
| 5,363,444 A | | 11/1994 | Norris |
| 5,497,339 A | | 3/1996 | Bernard |
| 5,534,888 A | * | 7/1996 | Lebby .................. G06F 1/1616 345/672 |
| 5,538,430 A | * | 7/1996 | Smith .................... B42D 3/123 434/178 |
| 5,606,621 A | | 2/1997 | Reiter et al. |
| 5,613,222 A | | 3/1997 | Guenther |
| 5,692,059 A | | 11/1997 | Kruger |
| 5,721,783 A | | 2/1998 | Anderson |
| 5,749,072 A | | 5/1998 | Mazurkiewicz et al. |
| 5,771,438 A | | 6/1998 | Palermo et al. |
| 5,802,167 A | | 9/1998 | Hong |
| 5,929,774 A | | 7/1999 | Charlton |
| 5,933,506 A | | 8/1999 | Aoki et al. |
| 5,949,896 A | | 9/1999 | Nageno et al. |
| 5,987,146 A | | 11/1999 | Pluvinage et al. |
| 6,021,207 A | | 2/2000 | Puthuff et al. |
| 6,021,306 A | * | 2/2000 | McTaggart ................ B42C 9/00 434/308 |
| 6,054,989 A | | 4/2000 | Robertson et al. |
| 6,081,724 A | | 6/2000 | Wilson |
| 6,094,492 A | | 7/2000 | Boesen |
| 6,111,569 A | | 8/2000 | Brusky et al. |
| 6,112,103 A | | 8/2000 | Puthuff |
| 6,157,727 A | | 12/2000 | Rueda |
| 6,167,039 A | | 12/2000 | Karlsson et al. |
| 6,181,801 B1 | | 1/2001 | Puthuff et al. |
| 6,208,372 B1 | | 3/2001 | Barraclough |
| 6,275,789 B1 | | 8/2001 | Moser et al. |
| 6,339,754 B1 | | 1/2002 | Flanagan et al. |
| 6,408,081 B1 | | 6/2002 | Boesen |
| D464,039 S | | 10/2002 | Boesen |
| 6,470,893 B1 | | 10/2002 | Boesen |
| D468,299 S | | 1/2003 | Boesen |
| D468,300 S | | 1/2003 | Boesen |
| 6,525,706 B1 | * | 2/2003 | Rehkemper .............. G09B 5/06 345/87 |
| 6,542,721 B2 | | 4/2003 | Boesen |
| 6,560,468 B1 | | 5/2003 | Boesen |
| 6,654,721 B2 | | 11/2003 | Handelman |
| 6,664,713 B2 | | 12/2003 | Boesen |
| 6,694,180 B1 | | 2/2004 | Boesen |
| 6,718,043 B1 | | 4/2004 | Boesen |
| 6,738,485 B1 | | 5/2004 | Boesen |
| 6,748,095 B1 | | 6/2004 | Goss |
| 6,754,358 B1 | | 6/2004 | Boesen et al. |
| 6,784,873 B1 | | 8/2004 | Boesen et al. |
| 6,788,283 B1 | * | 9/2004 | Blotky ................ G06F 15/0283 345/156 |
| 6,823,195 B1 | | 11/2004 | Boesen |
| 6,852,084 B1 | | 2/2005 | Boesen |
| 6,879,698 B2 | | 4/2005 | Boesen |
| 6,892,082 B2 | | 5/2005 | Boesen |
| 6,920,229 B2 | | 7/2005 | Boesen |
| 6,952,483 B2 | | 10/2005 | Boesen et al. |
| 6,987,986 B2 | | 1/2006 | Boesen |
| 7,136,282 B1 | | 11/2006 | Rebeske |
| 7,203,331 B2 | | 4/2007 | Boesen |
| 7,209,569 B2 | | 4/2007 | Boesen |
| 7,215,790 B2 | | 5/2007 | Boesen et al. |
| 7,463,902 B2 | | 12/2008 | Boesen |
| 7,508,411 B2 | | 3/2009 | Boesen |
| 7,802,386 B2 | * | 9/2010 | Mandelbaum ....... B42D 15/022 40/124.03 |
| 7,983,628 B2 | | 7/2011 | Boesen |
| 8,140,357 B1 | | 3/2012 | Boesen |
| 8,446,290 B2 | * | 5/2013 | Affolter ................ B42D 3/123 340/815.83 |
| 9,415,621 B2 | * | 8/2016 | Fahrer ..................... B42D 3/00 |
| 9,860,597 B2 | * | 1/2018 | Mahbubani .......... H04N 21/472 |
| 2001/0005197 A1 | | 6/2001 | Mishra et al. |
| 2001/0027121 A1 | | 10/2001 | Boesen |
| 2001/0056350 A1 | | 12/2001 | Calderone et al. |
| 2002/0002413 A1 | | 1/2002 | Tokue |
| 2002/0007510 A1 | | 1/2002 | Mann |
| 2002/0010590 A1 | | 1/2002 | Lee |
| 2002/0030637 A1 | | 3/2002 | Mann |
| 2002/0046035 A1 | | 4/2002 | Kitahara et al. |
| 2002/0057810 A1 | | 5/2002 | Boesen |
| 2002/0076073 A1 | | 6/2002 | Taenzer et al. |
| 2002/0118852 A1 | | 8/2002 | Boesen |
| 2003/0065504 A1 | | 4/2003 | Kraemer et al. |
| 2003/0100331 A1 | | 5/2003 | Dress et al. |
| 2003/0104806 A1 | | 6/2003 | Ruef et al. |
| 2003/0115068 A1 | | 6/2003 | Boesen |
| 2003/0125096 A1 | | 7/2003 | Boesen |
| 2003/0218064 A1 | | 11/2003 | Conner et al. |
| 2004/0070564 A1 | | 4/2004 | Dawson et al. |
| 2004/0160511 A1 | | 8/2004 | Boesen |
| 2005/0043056 A1 | | 2/2005 | Boesen |
| 2005/0125320 A1 | | 6/2005 | Boesen |
| 2005/0148883 A1 | | 7/2005 | Boesen |
| 2005/0165663 A1 | | 7/2005 | Razumov |
| 2005/0196009 A1 | | 9/2005 | Boesen |
| 2005/0251455 A1 | | 11/2005 | Boesen |
| 2005/0266876 A1 | | 12/2005 | Boesen |
| 2006/0029246 A1 | | 2/2006 | Boesen |
| 2006/0074671 A1 | | 4/2006 | Farmaner et al. |
| 2006/0074808 A1 | | 4/2006 | Boesen |
| 2008/0109309 A1 | * | 5/2008 | Landau .............. G06Q 30/0267 705/14.64 |
| 2008/0254780 A1 | | 10/2008 | Kuhl et al. |
| 2013/0015079 A1 | * | 1/2013 | Arzoumanian ........ A45C 11/16 206/6.1 |
| 2014/0232615 A1 | | 8/2014 | Acosta et al. |
| 2016/0059146 A1 | * | 3/2016 | Javidan .................. A63H 33/38 446/147 |

FOREIGN PATENT DOCUMENTS

| | | |
|---|---|---|
| JP | 06292195 | 10/1998 |
| WO | 2008054715 A2 | 5/2008 |
| WO | 2014043179 A2 | 3/2014 |
| WO | 2015110577 A1 | 7/2015 |
| WO | 2015110587 A1 | 7/2015 |

OTHER PUBLICATIONS

Announcing the $3,333,333 Stretch Goal (Feb. 24, 2014).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).

(56) References Cited

OTHER PUBLICATIONS

BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 16, 2014).
BRAGI Update—On Track, Design Verification, How It Works and What's Next(Jul. 15, 2015).
BRAGI Update—On Track, On Track and Gems Overview (Jun. 24, 2015).
BRAGI Update—Status on Wireless, Supply, Timeline and Open House@BRAGI(Apr. 1, 2015).
Bragi Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

INTERACTIVE PRODUCT PACKAGING SYSTEM AND METHOD

PRIORITY STATEMENT

This application claims priority to U.S. Provisional Patent Application No. 62/211,740, filed Aug. 29, 2016, hereby incorporated by reference in its entirety.

BACKGROUND

I. Field of the Disclosure

The present invention relates to packaging systems. More specifically, but not exclusively, the present invention relates to packaging systems for electronic devices.

II. Description of the Art

The adaption rate of wearable devices is increasing exponentially. This growth is festered by the many newly released devices being released monthly. However, introducing new technology may be challenging because of the lack of familiarity and understanding of the new technology. Many times it is difficult for buyers to familiarize themselves with new devices once purchased. The learning curve can be steep resulting in many users feeling overwhelmed or apprehensive. Unsatisfied customers are unlikely to learn all of the features of their new electronic devices resulting in more returns and slower migrations to the new technology including fewer purchases.

SUMMARY OF THE DISCLOSURE

In one embodiment, the illustrative embodiments provide a packaging system and method for providing information through a packaging system. A cover page of the packaging system is displayed. A determination of a page accessed with the packaging system is made. A display action associated with the page of the packaging system is performed in response to a user turning to the next page.

Another embodiment provides a packaging system for one or more electronic devices. The packaging system includes a case structurally supporting a smart case. The case includes a cover page that opens to a number of pages providing information about the one or more electronic devices. The packaging system further includes the smart case supporting the one or more electronic devices. The case includes a transparent window for viewing the one or more electronic devices throughout each of the number of pages.

Yet another embodiment provides a packaging system for wireless earpieces. The packaging system includes a case structurally supporting a smart case. The case includes a cover page that opens to a number of pages providing information about the wireless earpieces. The packaging system further includes the smart case supporting the wireless earpieces. The case includes one or more cutouts for a user to touch the wireless earpieces while viewing each of the plurality of pages.

According to one aspect, a method for providing information through a packaging system includes displaying a cover page of the packaging system, determining a page accessed within the packaging system, and performing a display action associated with the page of the packaging system in response to a user turning to the next page. The method may further include performing the display action associated with the cover of the packaging system. The packaging system may enclose one or more electronic devices, wherein the packaging system defines a transparent window for viewing the one or more electronic devices from at least the cover and a plurality of pages including the page. The packaging system may include a plurality of pages including the cover and the page. The packaging system may not appear to have a spine for the plurality of pages. The display action may include activating an electronic device enclosed by the packaging system. The display action may include playing audio content from a speaker of the packaging system. The display action may include activating one or more lights associated with the packaging system. The cover page and the plurality of pages may include magnets. The display action may be performed by an interactive screen of the packaging system. The interactive screen may include one of a liquid crystal display, a transparent display, a dual-sided transparent liquid crystal display, and electronic ink. The display actions may be associated with each of a plurality of pages. The packaging system may be configured to communicate with one or more devices through an Internet connection. The display actions may include providing registration, support, warranty, troubleshooting, and product information.

According to another aspect, a packaging system for one or more electronic devices is provided. The packaging system may include a case structurally supporting a smart case, the case includes a cover page that opens to a plurality of pages providing information about the one or more electronic devices and the smart case supporting the one or more electronic devices, wherein the case includes a window for viewing the one or more electronic devices throughout each of the plurality of pages. The case may include a spine that is not visible to a user. The packaging system may further include a speaker playing at least the information audibly to a user. One or more of the case, the one or more electronic devices, and the smart case may include an LED array for guiding a user through the plurality of pages. The one or more electronic devices may be wireless earpieces. The smart case may power display actions performed by the packaging system until a threshold power level is reached. The case may define one or more cut-outs for a user to physically interact with the one or more electronic devices. The cover page and the plurality of pages may include magnets. The packaging system may further include an interactive screen integrated with the case, wherein one or more display actions are performed by the interactive screen in response to a page selected from the plurality of pages. The interactive screen may include one of a liquid crystal display, a transparent display, a dual-sided transparent liquid crystal display, and electronic ink. Distinct display actions may be associated with each of the plurality of pages. The display actions may include providing registration, support, warranty, troubleshooting, and product information. The packaging system may further include a transceiver for communication with one or more devices through an Internet connection.

According to another aspect, a packaging system fix wireless earpieces may include a case structurally supporting a smart case, the case includes a cover page that opens to a plurality of pages providing information about the wireless earpieces. The smart case may support the wireless earpieces, wherein the case includes one or more cutouts for a user to touch the wireless earpieces while viewing each of the plurality of pages. The one or more cutouts may be defined within a window of the case. The smart case may power display actions performed by the packaging system until a threshold power level is reached. The packaging system may further include a speaker playing at least the information audibly to a user. The case may include a spine that is not visible to a user. The packaging system may further include an interactive screen integrated with the case, wherein one or more display actions are performed by the interactive screen in response to a page selected from the plurality of pages. The interactive screen may be a liquid crystal display, a transparent display, a dual-sided transparent liquid crystal display, or electronic ink. The distinct display actions may be associated with each of the plurality of pages. The display actions may include providing registration, support, warranty, troubleshooting, and product information. The packaging system may further include a transceiver for communication with one or more devices through an Internet connection.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

Figure 1:
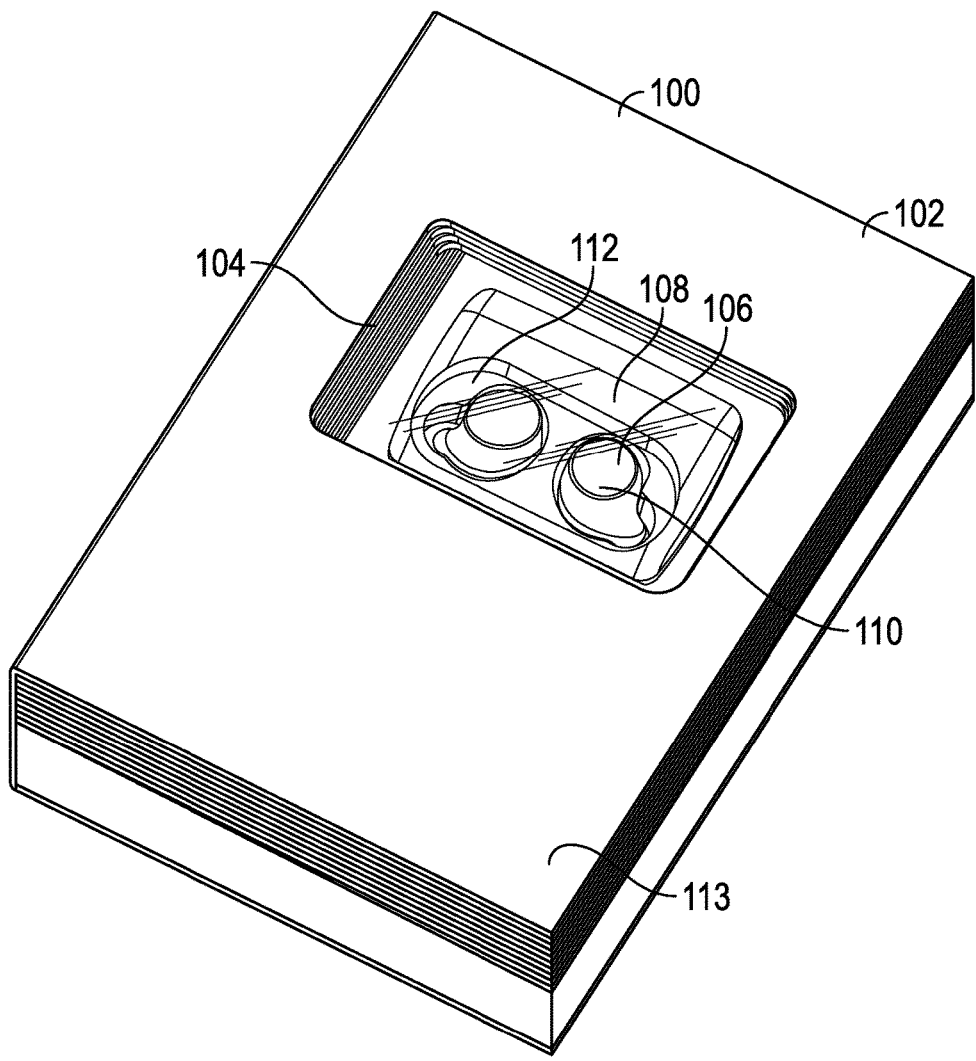
FIG. 1 is a pictorial representation of a packaging system in accordance with an illustrative embodiment.

The illustrative embodiments provide a packaging system and method for providing information to a user. The packaging system provides a method of interacting with the user to educate the user regarding the electronic device(s) or other product as well as training the user how to use the product. For example, the electronic device(s) may be a pair of wireless earpieces as are illustrated herein. However, any number of electronic devices suitable for utilization by users may be enclosed within the packaging system. Reference to the electronic, device or devices or wireless earpieces may refer to individual devices, sets of devices, or a number of different devices. The contents of the packaging system, electronic or not, may also be referred to as a product, products, or contents. Buyers, potential buyers, or individual users of the electronic devices may be referenced interchangeably.

The packaging system displays the electronic device throughout a display process. The display process may be performed prior to purchase of the electronic device, during a purchase or shopping process, or after purchased. The packaging system has a form factor that allows the user to interact in a manner that the user may consider to be friendly and pleasant. The packaging system may enclose an electronic device that may not be immediately understood by the user. As a result, the packaging system maximizes the visualization of the electronic device during the education process.

In one embodiment, the packaging system provides a sequential process for learning about the electronic device step-by-step. The packaging system may include a cover that opens up like a book. The sensation of opening the packaging system and reading about the electronic device maximizes the visual-tactile interface. The packaging system may include a number of durable pages that the user navigates based on visual and tactile prompts to learn about the electronic device. After covering the operating instructions and other information in a user friendly and informative process, the electronic device is ready to be accessed. As a result, the packaging system diminishes the likelihood of a return or the user misunderstanding the operation and functionality of the electronic device. The cover page and the other pages of the packaging system may be grouped together utilizing magnets. As a result, the default status of the packaging system is that the system remains closed and awaiting the user to interact with it by opening the front cover.

The packaging system minimizes the potential intimidation factor of the new electronic device by training the user how to use the electronic device in a methodical and easy to understand process. As a result, the possibility of returns or dissatisfaction with the electronic device are minimized. The packaging device may become a stable reference and storage system for the electronic device for ongoing usage.

The illustrative embodiments may utilize a transparent window, liquid crystal display, screen, or opening to visually display the electronic device. The window allows the user to see the electronic device at all times and may provide an access point to interact with the functionality of the electronic device in a pre-defined way.

Sensors of the packaging system or the electronic device may be utilized to perform various display processes or to provide additional information. For example, the sensors may include accelerometers, photo sensors, galvanic sensors, inertial sensors, gyroscopes, or so forth that determine when to activate light emitting diodes, electronic ink (e-ink), touch screens, or so forth. For example, light emitting diodes of the packaging system may change colors when the packaging system is picked up or when pages are turned. In other embodiments, the sensors or other components may be part of the packaging materials that may be discarded or no longer used once the electronic device is unboxed. The illustrative embodiments may utilize the resources of the packaged electronics to maximize the display, presentation, and buying experience of the overall packaging system. The illustrative embodiments provide for enhanced notoriety of the packaging system whether stacked, positioned, or hung from displays. As a result, the packaging system may maintain a fresh and potent appearance. In addition, the packaging system continues to maintain the safety and charge of the electronic devices in the packaging system so that they are protected and ready to use once the packaging system is opened by the buyer.

The packaging system may also be utilized as a long term protection, care, and charging system for the electronic devices which may include wireless earpieces and a smart case. For example, the packaging system may include a solar panel or charging port for charging the various devices stored within the packaging system. The packaging system may be a secure device and location that provides for continued protection, charging synchronization, training and utilization of the packaging system beyond just a traditional transport, protection, and display package.

Figure 2:
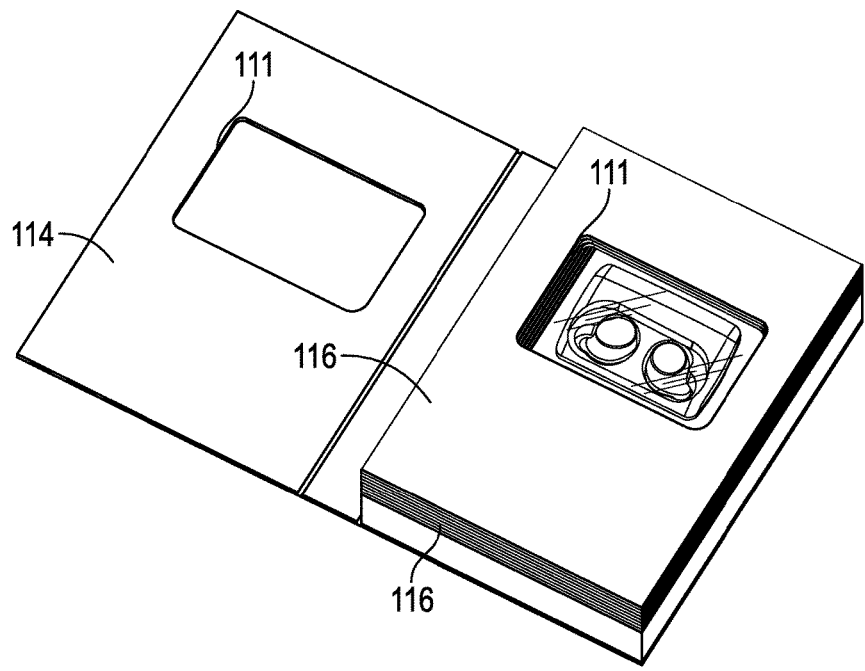
FIG. 2 is a pictorial representation of the packaging system of FIG. 1 opened in accordance with an illustrative embodiment.

FIGS. 1 and 2 are pictorial representations of a packaging system 100 in accordance with an illustrative embodiment. The packaging system 100 may have any number of components or configurations. The embodiments herein described and shown may be combined in any number of combinations to enhance the structure, functionality and aesthetics of the packaging system 100. In one embodiment, the packaging system 100 may include a case 102, a transparent window 104, wireless earpieces 106, a smart case 108, an LED array 110, an access point 112, a cover 113, and pages 114-148. The packaging system 100 is configured to provide information about the wireless earpieces 106 to a user that picks up the packaging system 100.

The case 102 may be square or rectangularly shaped to be stood up, balanced, or otherwise stacked. However, any number of exterior shapes may be utilized for the case 102 of the packaging system 100 based on the desired aesthetics (e.g., spherical, cylindrical, etc.). The case 102 and pages 114-148 may be formed of cardboard, paper, plastic, metal, polymers, or a combination of materials. The case 102 may include a frame, cases, or other components that may be reinforced utilizing internal structures, supports, and so forth to protect the wireless earpieces 106. The exterior of the case 102 may include labels, text, writing, stickers, or other data or information about the wireless earpieces 106, smart case 108, and contents of the packaging system 100. The case 102 and other internal components of the packaging system excluding the wireless earpieces 106 and the smart case 108 may also be referred to as packaging.

The packaging system 100 may include any number of pages 114-148. The pages 114-148 may provide text, drawings, pictures, instructions, and so forth to walk the user through operation and utilization of the wireless earpieces 106.

In another embodiment, the packaging system 100 may include a hanger (not shown). The hanger is a loop or strap utilized to display or store the packaging system 100. In one embodiment, the hanger may be a plastic or fabric loop, clip, hook, or strap that supports the packaging system 100.

Figure 3:
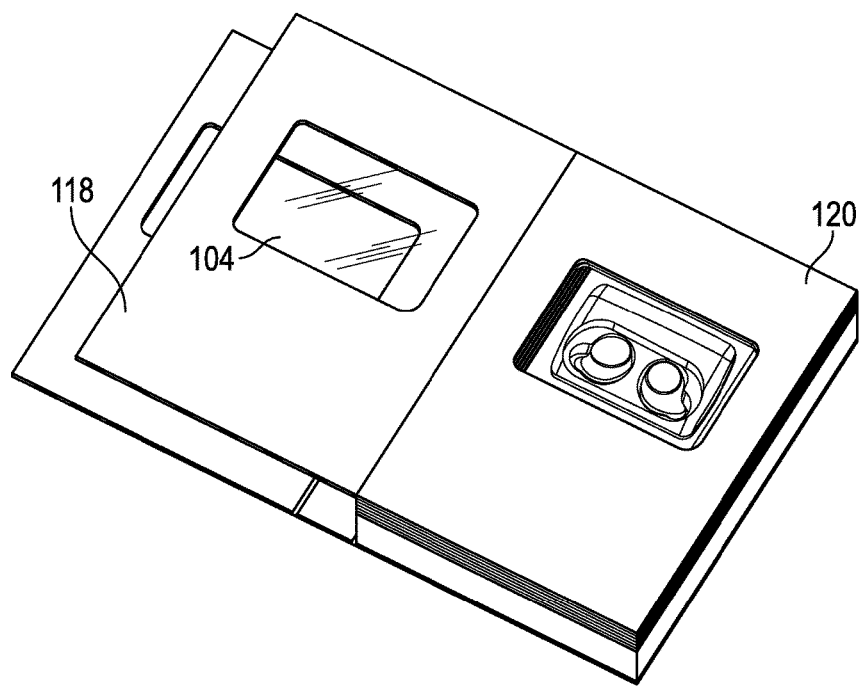
FIG. 3 shows another pictorial representation of the packaging system of FIG. 1 opened in accordance with an illustrative embodiment.
Figure 4:
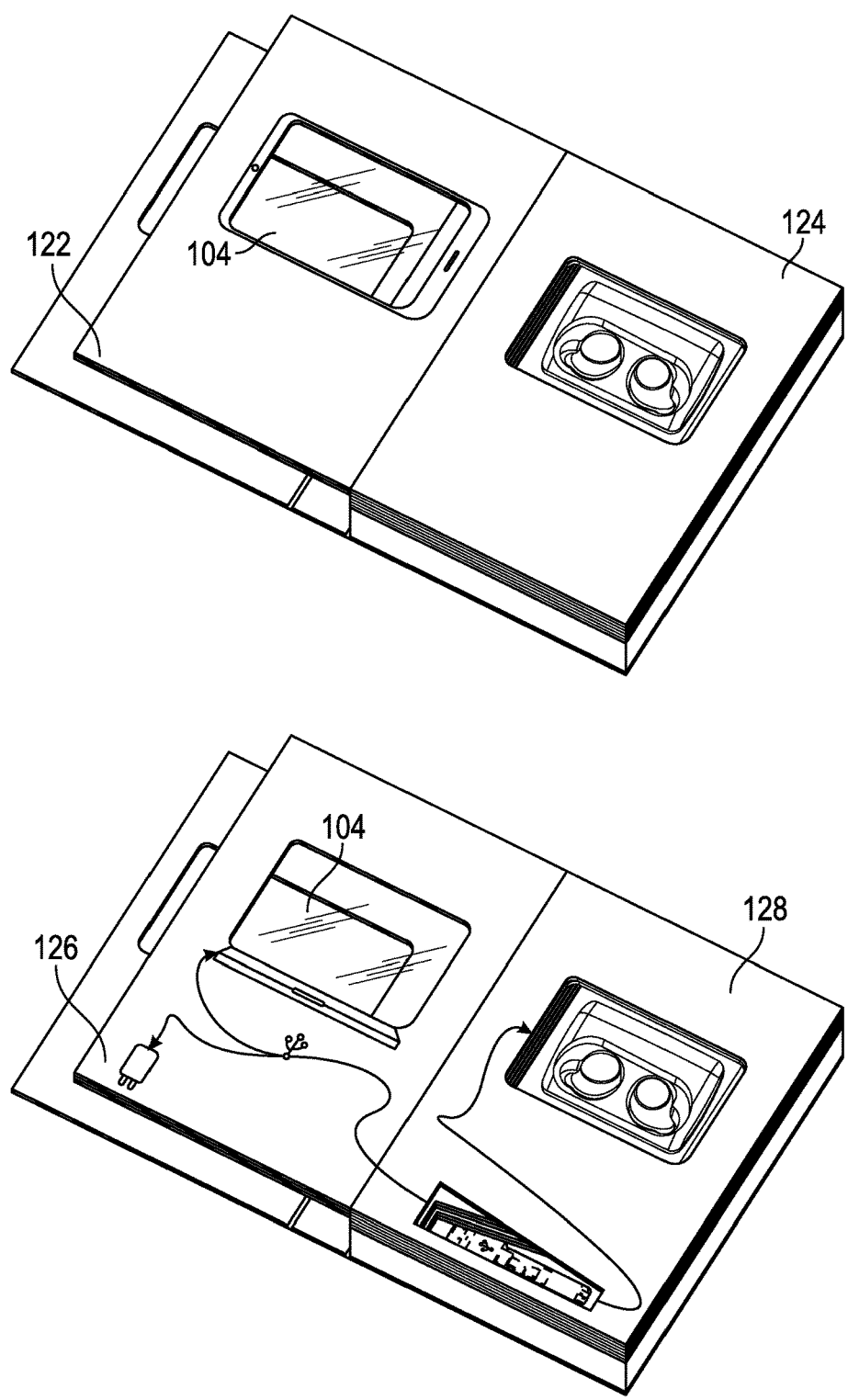
FIG. 4 shows another pictorial representations of the packaging system of FIG. 1 opened in accordance with an illustrative embodiment.
Figure 4:
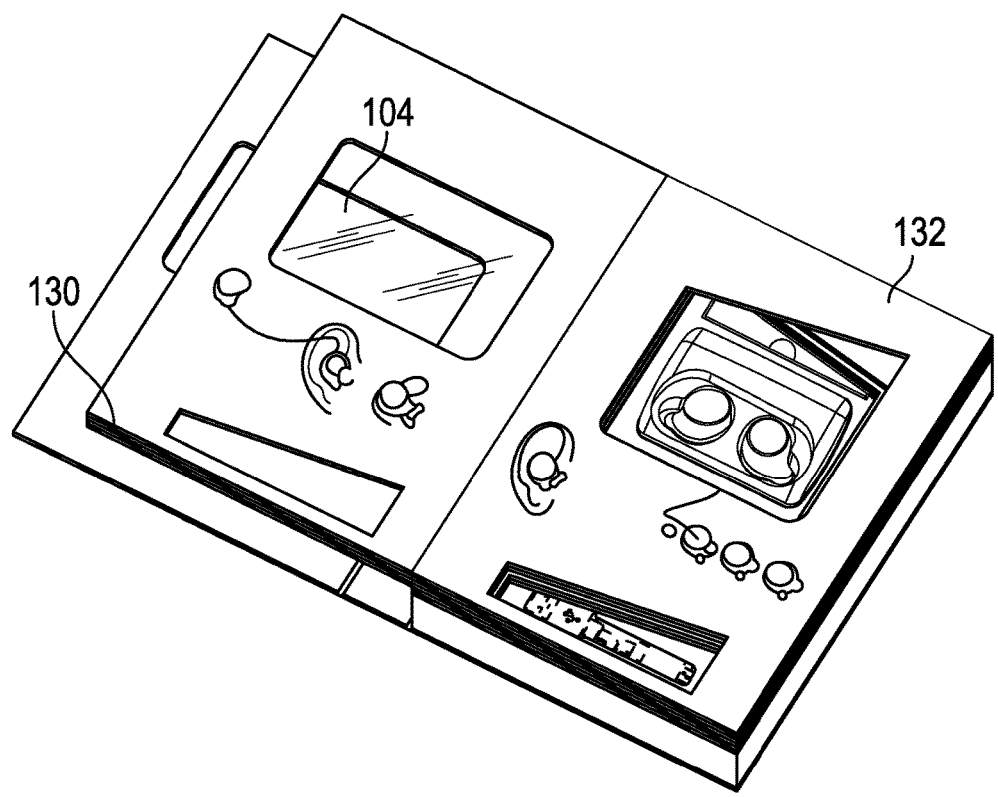
Figure 5:
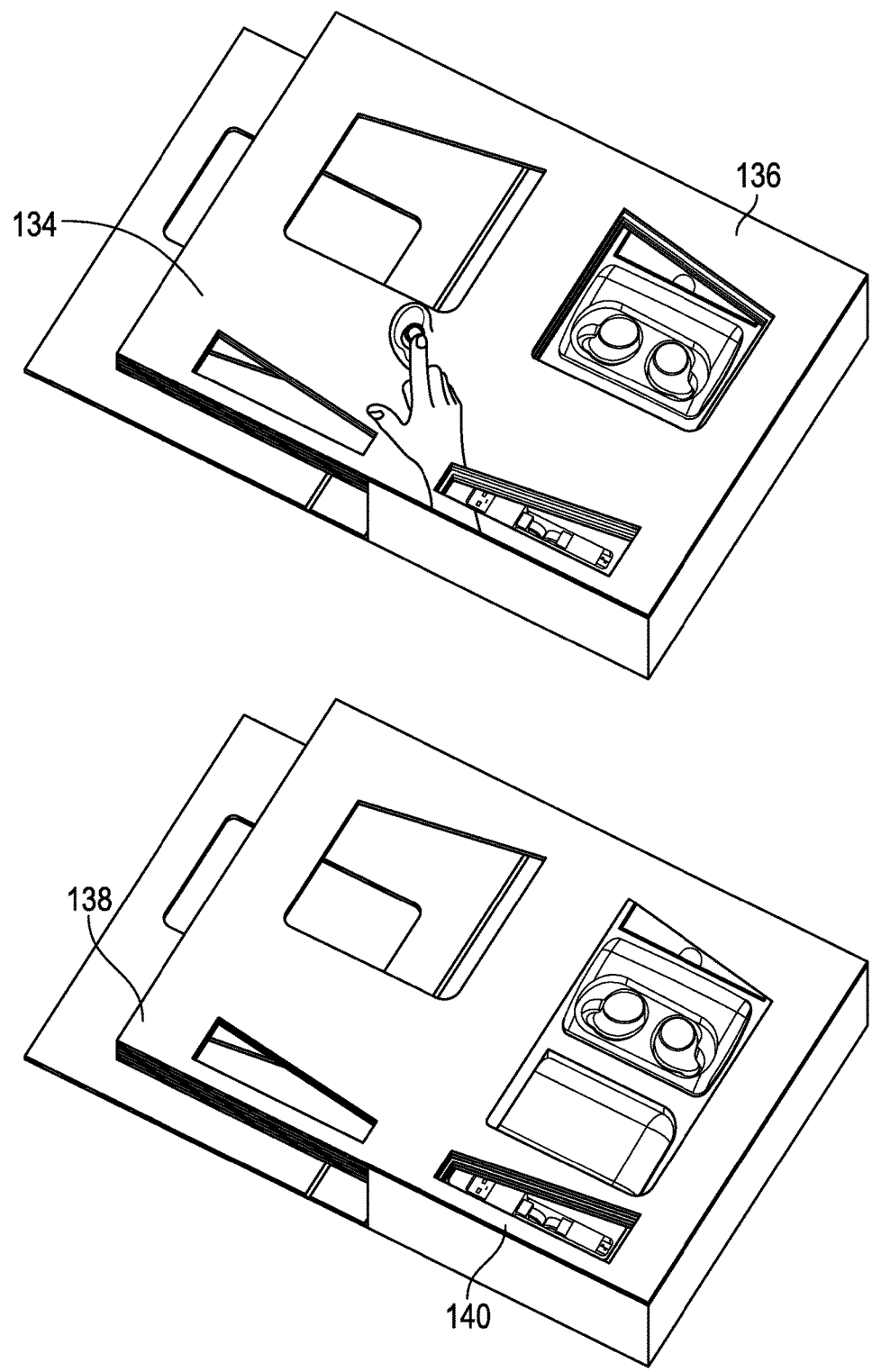
FIG. 5 shows another pictorial representations of the packaging system of FIG. 1 opened in accordance with an illustrative embodiment.
Figure 6:
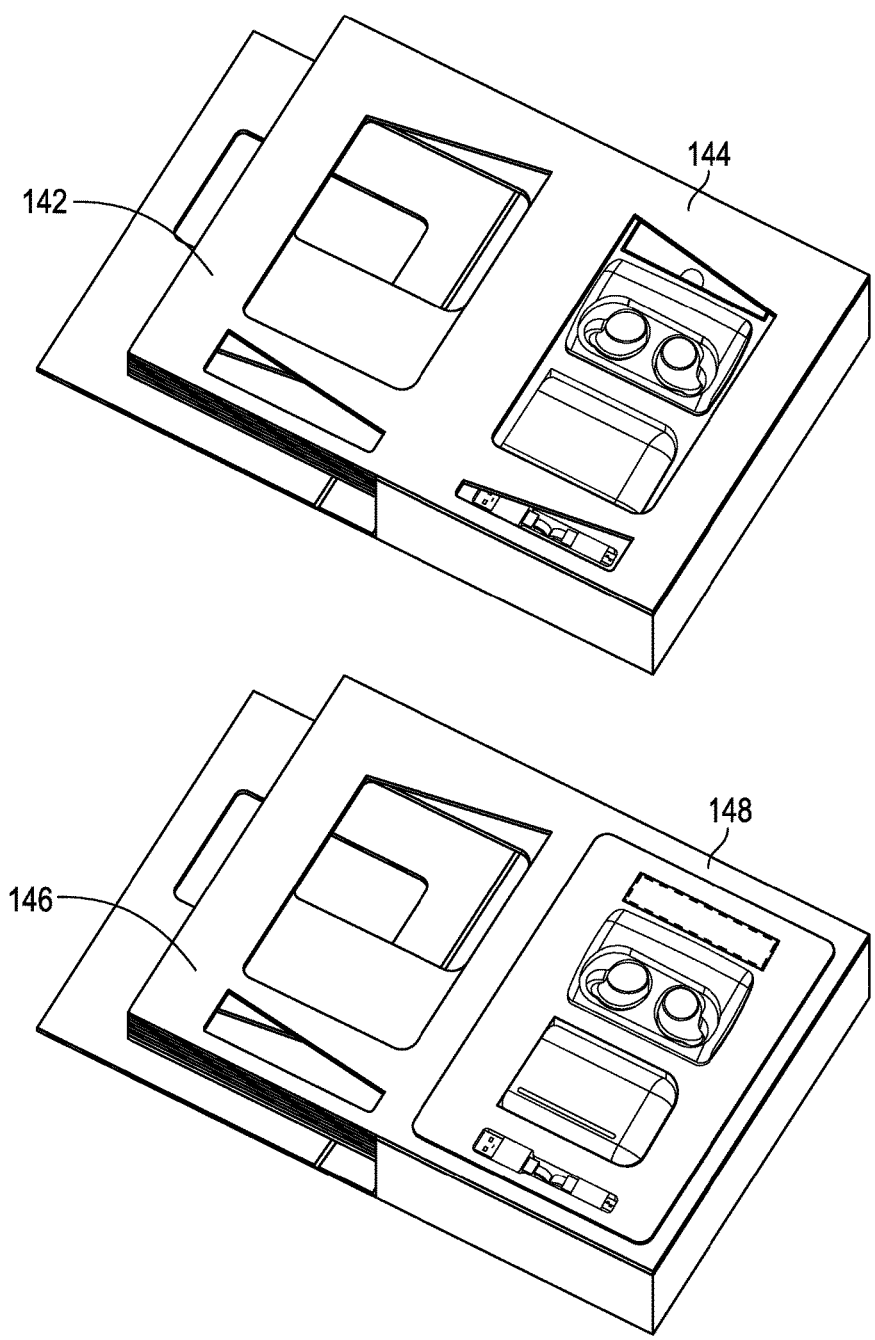
FIG. 6 shows another pictorial representations of the packaging system of FIG. 1 opened in accordance with an illustrative embodiment.

The packaging system 100 may also include the window 104 in the exterior of the packaging system 100 to view the wireless earpieces 106. For example, the window 104 may represent a plastic or glass segment or screen that is integrated with, attached to, or adhered to the case 102. The window 104 may also represent a liquid crystal display (e.g., transparent dual sided LCD), organic display, e-ink display, or other screens or interactive displays. In one example, the window 104 may represent a substantially rigid plastic piece sized to display the wireless earpieces 106 and/or the smart case 108. The packaging system 100 may be configured such that the window 104 is always visible and able to interact with the user as they move through the pages 114-148 (e.g., see the window 104 shown in FIGS. 3-4). The window 104 may represent one or more windows on any of the sides of the case 102 or within the packaging system 100. In one embodiment, the window 104 may allow for magnified viewing of the contents of the packaging system (e.g., magnified views of text). In another embodiment, the window 104 may be an electronic touchscreen, e-ink, or liquid crystal display that allows for interaction with the device itself or with descriptive materials within the packaging system 100.

The wireless earpieces 106 may be positioned within the smart case 108 or may be separately packaged with the packaging system 100. In one embodiment, the wireless earpieces 106 are packed within the smart case 108 so that the battery and other components of the smart case 108 may be utilized as resources. In one embodiment, the smart case 108 may include LEDs, a touch screen, or other display components that may be activated by the packaging system 100 to help visually display the wireless earpieces 106. In another embodiment, any of the packaging system 100, the smart case 108, and the wireless earpieces 106 may include speakers that may be utilized to supplement the buyer interactions performed by the packing system 100. For example, a beep, audible logo, song, information about the wireless earpieces 106, or other audio information may be played in response to a stimulus being detected (e.g., detected motion, motion of the packaging system 100, light variations, etc.) or other criteria (e.g., timer elapsing), etc.). The transparent window 104 may allow the visual displays or interactions to be more effectively communicated to the buyer.

The access point 112 may represent one or more paints or components of the packaging system 100 that allow interaction with the wireless earpieces 106. In one embodiment, the access point 112 may represent a portion of the wireless earpieces 106 that is touch sensitive. For example, the access point 112 may include a cutout that allows the buyer to temporarily activate the wireless earpieces 106 by positioning a finger on the exterior user interface of the wireless earpieces 106. In another embodiment, the access point 112 may represent a portion of the transparent window 104 or case of the packaging system 100. The access point 112 may also include depressions, deformations, or other structures of the case 102 or the transparent window 104 that facilitate interaction of the buyer with the wireless earpieces 106. In one embodiment, the buyer may depress the access point 112 to activate the LED array 110 of the wireless earpieces 106. The access point 112 may also represent one or more babbles, extensions, or other components that may be pressed or activated to interact with the wireless earpieces 106. For example, a bubble may allow the user to activate the wireless earpieces 106 without actually touching them. Likewise, remote switches, activation buttons, or other components may also be utilized (e.g., push button switch connected to the wireless earpieces 106 by a small wire). Further, the access point 112 may be anywhere on the surface area of the packaging system if connected to a personal area network of the wireless earpieces 106 or of the packaging system 100. A galvanic interface may detect the contact of the user with the case 101, and begin the activated packaging processes.

In one embodiment, the LED array 110 represents LEDs integrated with the wireless earpieces 106. For example, the LED array 110 may be utilized to indicate a power status, functional status, mode, or other information when removed from the packaging system 100. The LED array 110 may be activated to attract a buyer's attention whether the packaging system 100 is hanging on a rack, stacked on a shelf, or otherwise positioned. For example, one or more of the NEC chips of the wireless earpieces 106 or of the packaging system 100 may determine the location and orientation of the packaging system 100. If the packaging system 100 is determined to be visible to one or more buyers, the LED array 110 may be activated by the packaging system 100 to attract attention. The packaging system 100 may utilize the sensor available to detect motion in front of or proximate the packaging system 100 to activate device or packaging functions. Sensors of the wireless earpieces 106, such as accelerometers, magnetometers, gyroscopes, touch sensors, photo sensors, and so forth, may be utilized to activate the LED array 110. In one embodiment, the logic, microprocessors, or other forms of processing power of the wireless earpieces 106 may be utilized to determine when and how the LED array 110 or other interface components are activated.

In another embodiment, the LED array 110 may represent LEDs of the smart case 108. The LED array 110 within the smart case 108 may surround the receptacles configured to receive the wireless earpieces 106 or may be present on other portions of the frame of the smart case 108. In one example, the LED array 110 may represent the charge status of the smart case 108, whether the wireless earpieces 106 are connected to the smart case 108, synchronization information between the wireless earpieces 106 and the smart case 108, and other similar information. In one embodiment, the LED array 110 may be powered by the smart case 108 until a default power level is reached. For example, the smart case 108 may retain enough power to ensure that the wireless earpieces 106 are fully charged and ready to use once purchased. As a result, power utilized for attracting buyers and showcasing the packaging system 100 may be cut off at a predefined threshold to preserve the charge and full functionality of the wireless earpieces 106 once the packaging system 100 is opened. These sensors and NEC chips may also be integrated with either the smart case 108 or the case 102.

In yet another embodiment, the LED array 110 may be integrated with the case 102. For example, a small disposable battery may power the LED array 110 in response to detecting motion in front of the packaging system 100 or motion of the packaging system 100. As a result, the LED array 110 may represent LEDs of any or all portions of the packaging system 100 including the case 102, the wireless earpieces 106 and the smart case 108.

In another embodiment, the packaging system 100 may include a cover (not shown). The cover may be utilized when shipping the packaging system 100 to further protect the various components. The cover may slide over the case 102 to cover and protect the packaging system 100. In one embodiment, the cover may be transparent or include transparent windows or cut-outs to display the wireless earpieces 106 and other display components of the packaging system 100.

The size and shape of the packaging system 100 may vary. In one embodiment, the packaging system 100 may be miniaturized or have a reduced footprint to preserve shelf, storage, or retail space, decrease shipping costs (e.g., associated with size and weight), preserve economic and environmental resources, and so forth.

In the various embodiments, the orientation of the wireless earpieces 106 within the case 102 may vary based on the size and shape of the packaging system 100 and the corresponding case 102. For example, as shown, the wireless earpieces 106 and corresponding transparent window 104 are positioned such that wireless earpieces 106 may be most visible when the case 102 is positioned vertically. As a result, a cover 113 may be opened for the packaging system to be read like a book. In one embodiment, a non-visible spine may be incorporated in the left hand side of the case 102. However, in other embodiments, the non-visible spine may be incorporated along a top, bottom or right hand side of the case 102. The pages 114-148 and the cover 113 may be formed of high strength paper, cardboard, plastic, or combinations thereof to further strengthen the packaging system 100 and to provide a secure place for storing the smart case 108 and the wireless earpieces 106 even once the wireless earpieces 106 have been initially removed for utilization.

Although not shown, each of the pages 114-148 and the cover 113 may include magnets, metal, Velcro, or other components for keeping the packaging system 100 in a closed configuration until opened by a user. In other embodiments, the packaging system 100 may include straps, latches, or other mechanisms for securing the cover 113 and the pages 114-148 in a closed position.

As shown in FIGS. 2-6, the pages 114-148 may include distinct content. In one embodiment cutouts 118 of the pages 114-148 may reveal more of the wireless earpieces 106, smart case 108, and peripherals enclosed by the packaging system 100. In one embodiment, peripherals may include charging cords, plug-ins, wires, case covers, or so forth. The cutouts 118 are open spaces defined within the pages 114-148 that may sequentially or iteratively be used to teach and train the user about the operation of the wireless earpieces 106, smart case 108, and utilization of the peripherals. The exterior or interior surface of the packaging system 100 including the pages 114-148 may include galvanic or touch sensor and may include electronic ink (e.g., black and white, color, etc.). For example, the pages 114-148 of the packaging system 100 may display distinct content when pages are turned or when specific locations are touched. For example, the pages 114-148 may represent a single page with content that is changed utilizing a flexible display (e.g., OLED), e-ink, or other display mechanisms to display each page of an operating manual that may be indexed by selection elements, such as icons, dots, or so forth.

In one embodiment, the pages 114-148 may include an operating manual for the wireless earpieces 106. In other embodiments, the pages 114-148 may include marketing, product registration, training, technical, warranty, service, troubleshooting and help, or other information and data that may be reviewed in a user friendly way. The packaging system 100 may also be able to access the internet (e.g., Wi-Fi transceiver) to provide contact with the manufacturer for warranty information, diagnostic, troubleshooting, feedback or support. The packaging system 100 may also synchronize data, software, manuals, text, data, or other content utilized by the packaging system 100, the wireless earpieces 106, or the smart case 108.

Figure 7:
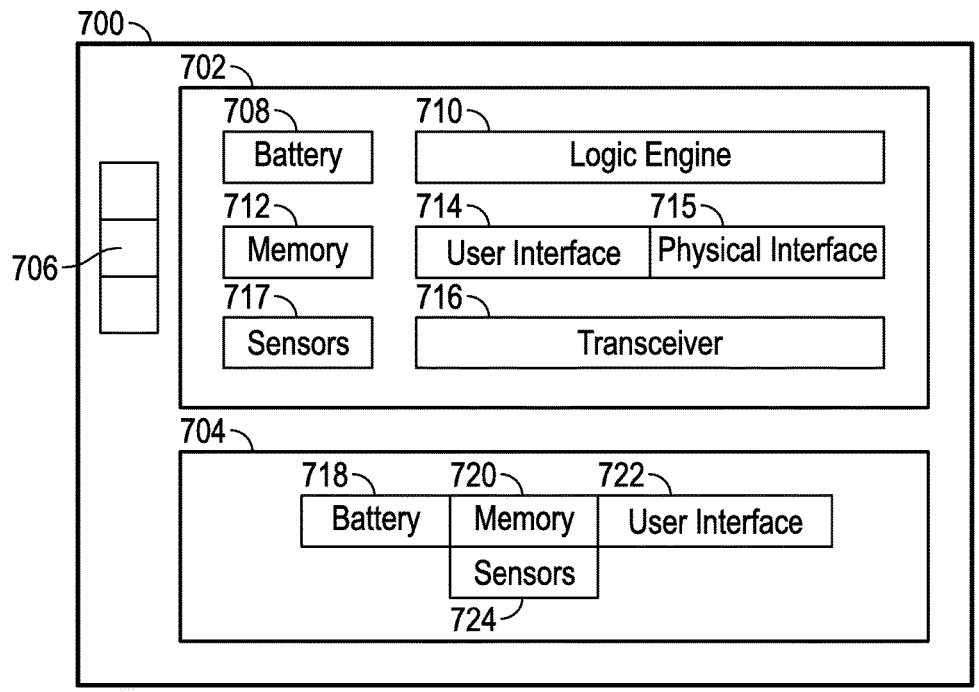
FIG. 7 is a block diagram of a packaging system in accordance with an illustrative embodiment.

FIG. 7 is a block diagram of a packaging system 700 in accordance with an illustrative embodiment. In one embodiment, the packaging system 700 may include wireless earpieces 702 (described collectively rather than individually), a smart case 704, and case components 706. In one embodiment, the packaging system 700 may perform display actions alone or more communicate with or detect other packaging systems (not shown). The display actions may be utilized to inform, teach, and train the user about the wireless earpieces 702.

The packaging system 700 may utilize functionality and components of each of the wireless earpieces 702, the smart case 704, and the case components 706 to implement the functions and processes herein described. The packaging system may have any number of configurations and may include various circuitry, connections, and other components. The packaging system 700 is one potential embodiment of the packaging system 100 of FIG. 1.

In one embodiment, the wireless earpieces 702 may include a battery 708, a logic engine 710, a memory 712, user interface 714, physical interface 715, a transceiver 716, and sensors 717. The smart case 704 may have a battery 718, a memory 720, an interface 722, and sensor or sensors 724.

The battery 708 is a power storage device configured to power the wireless earpieces 702. Likewise, the battery 718 is a power storage device configured to power the smart case 704. In other embodiments, the batteries 708 and 718 may represent a fuel cell, thermal electric generator, piezo electric charger, solar charger, ultra-capacitor, or other existing or developing power storage technologies.

The logic engine 710 is the logic that controls the operation and functionality of the wireless earpieces 702. The logic engine 710 may include circuitry, chips, and other digital logic. The logic engine 710 may also include programs, scripts, and instructions that may be implemented to operate the logic engine 710. The logic engine 710 may represent hardware, software, firmware, or any combination thereof. In one embodiment, the logic engine 710 may include one or more processors. The logic engine 710 may also represent an application specific integrated circuit (ASIC) or field programmable gate array (FPGA). The logic engine 710 may be utilize information and from the sensors 717 to determine the selected page, location, and orientation of the packaging system 700. The logic engine 702 may utilize this information and other criteria to determine when to activate the user interface 714.

For example, a processor included in the logic engine 710 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements of the smart case 702.

The memory 712 is a hardware element, device, or recording media configured to store data for subsequent retrieval or access at a later time. The memory 712 may be static or dynamic memory. The memory 712 may include a hard disk, random access memory, cache, removable media drive, mass storage, or configuration suitable as storage for data, instructions, and information. In one embodiment, the memory 712 and the logic engine 710 may be integrated. The memory may use any type of volatile or non-volatile storage techniques and mediums. The memory 712 may store information related to the status of the smart case 702 as well as the wireless earpieces 702. In one embodiment, the memory 712 may display instructions or programs for controlling the user interface 714 including one or more LEDs or other light emitting components, speakers, tactile generators (e.g., vibrator), and so forth.

The transceiver 716 is a component comprising both a transmitter and receiver which may be combined and share common circuitry on a single housing. The transceiver 716 may communicate utilizing Bluetooth, ZigBee, Ant+, near field communications, wireless USB, infrared, mobile body area networks, ultra-wideband communications, or other suitable radio frequency standards, networks, protocols, or communications. The transceiver 716 may also be a hybrid transceiver that supports a number of different communications. For example, the transceiver 716 may communicate with the smart case 704 or other packaging systems utilizing wired interfaces (e.g., wires, traces, etc.), NFC or Bluetooth communications.

The components of the wireless earpieces 702 (or the packaging system 700) may be electrically connected utilizing any number of wires, contact points, leads, busses, wireless interfaces, or so forth. In addition, the wireless earpieces 702 may include any number of computing and communications components, devices or elements which may include busses, motherboards, circuits, chips, sensors, ports, interfaces, cards, converters, adapters, connections, transceivers, displays, antennas, and other similar components.

The physical interface 715 is hardware interface of the wireless earpieces 702 for connecting and communicating with the smart case 704 or other electrical components. The physical interface 715 may include any number of pins, arms, or connectors for electrically interfacing with the contacts or other interface components of the smart case 704 or other charging or synchronization devices. For example, the physical interface 715 may be a micro USB port. In one embodiment, the physical interface 715 is a magnetic interface that automatically couples to contacts or an interface of the smart case 704. In another embodiment, the physical interface 715 may include a wireless inductor for charging the wireless earpieces 702 without a physical connection to the smart case 704 or other devices.

The user interface 714 is a hardware interface for receiving commands, instructions, or input through the touch (haptics) of the user, voice commands, or predefined motions. The user interface 714 may be utilized to control the other functions of the wireless earpieces 702. The user interface 714 may include the LED array, one or more touch sensitive buttons or portions, a miniature screen or display, or other input/output components. The user interface 714 may be controlled by the user or based on commands received from other components or interactions with the packaging system 700. The LED arrays may be utilized to perform one or more display actions alone or in synchronization with other packaging systems. For example, lighting up the LEDs in a pattern or in a way that highlights text or other content of the packaging system 700.

The sensors 717 may include accelerometers, gyroscopes, magnetometers, inertial sensors, photo detectors, page sensors, miniature cameras, and other similar instruments for detecting location, orientation, motion, and so forth even when the wireless earpieces 702 are packaged within the packaging system 700. In another embodiment, the smart case 704 or the case components 706 may also include sensors for detecting the location, orientation, and proximity of the packaging system 700 to other packaging systems. The case components 706 may also include an LED array, galvanic linkage or other touch sensors, battery, solar charger, actuators or vibrators, one or more touch screens or displays, an NEC chip, or other components as are referenced or described herein. The packaging system 700 may include page sensors for determining which page of the packaging system 700 is opened or being viewed by a user. As a result, appropriate audio light displays, or so forth may be played by the packaging system 700 based on the viewed page. For example, the pages may include embedded LEDs or other lights sources that light up to illuminate text, drawings, and illustrations on the pages in response to being opened to a specific page. In one embodiment, the lights may point out particularly important information, or instructions for the user. As a result, the user is more likely to understand proper utilization of the wireless earpieces 702 and less likely to return the wireless earpieces 702 due to dissatisfaction or other issues.

In one embodiment, the packaging system 700 includes galvanic or touch sensors or electronic ink that may determine when and how the display features and actions of the packaging system 700 are activated. In one embodiment, the packaging system 700 may change colors when touched by a user or picked up. The packaging system 700 may also change colors to highlight different portions of the packaging system 700 based on touch. The packaging system 700 may also dynamically change the content of the pages based on user touches and selections to reduce the number of pages and materials that may be required for the packaging system 700. In another embodiment, audio may be played based on the portion of the screen that is touched. Haptic feedback may also be utilized to provide touch-based feedback.

The smart case 704 may include components similar in structure and functionality to those shown for the wireless earpieces 702 including the battery 718, the memory 720, and the user interface 722. Although not shown, the smart case 704 may include logic or one or more microprocessors for implementing the processes and functions as are herein described. The battery 718 of the smart case 704 may have extra capacity which may be utilized by the packaging system to perform the display operations and processes herein described. For example, the wireless earpieces 702 may be connected, linked, or nested within the smart case 704 so that the battery 718 can maintain the charge of the battery 708 as well as powering the user interfaces 714 and/or 722 to attract potential buyers to the packaging system 700. In one embodiment, the battery 718 may be utilized until a power threshold is met. For example, the power threshold may require enough power to maintain and charge the wireless earpieces 702 for a month or more in a low power, power saving, sleep, or storage mode.

The user interface 722 of the smart case 704 also include a touch interface or display for indicating the status of the smart case 702. For example, a light may indicate the battery status of the smart case 702 as well as connected wireless earpieces 702, download/synchronization status (e.g., synchronizing, complete, last synchronization, etc.), or other similar information. An LED array of the user interface 722 may also be utilized for display actions. In another embodiment, device status indications may emanate from the LED array of the wireless earpieces 702 themselves, triggered for display by the user interface 722 of the smart case 704.

The battery 708 may itself be charged through a physical interface of the user interface 722. The physical interface may be integrated with the user interface 722 or may be a separate interface. For example, the user interface 722 may also include a hardware interface for connecting the smart case to a power supply or other electronic device. The user interface 722 may be utilized for charging as well as communications with externally connected devices. For example, the interface 710 may represent a mini-USB, micro-USB or other similar miniature standard connector. In another embodiment, a wireless inductive charging system may be utilized to initially replenish power to the wireless earpieces 702, the same inductive charging system may function in the same fashion over long periods of utility after the user purchases the device. The packaging system 700 may also charge the smart case 704 utilizing inductive charging.

The case components 706 may further include peripheral devices such as charging cords, power adapters, inductive charging adapters, solar cells, batteries, additional light arrays, speakers, smart case covers, transceivers, e.g., Wi-Fi, cellular, etc.), or so forth.

Figure 8:
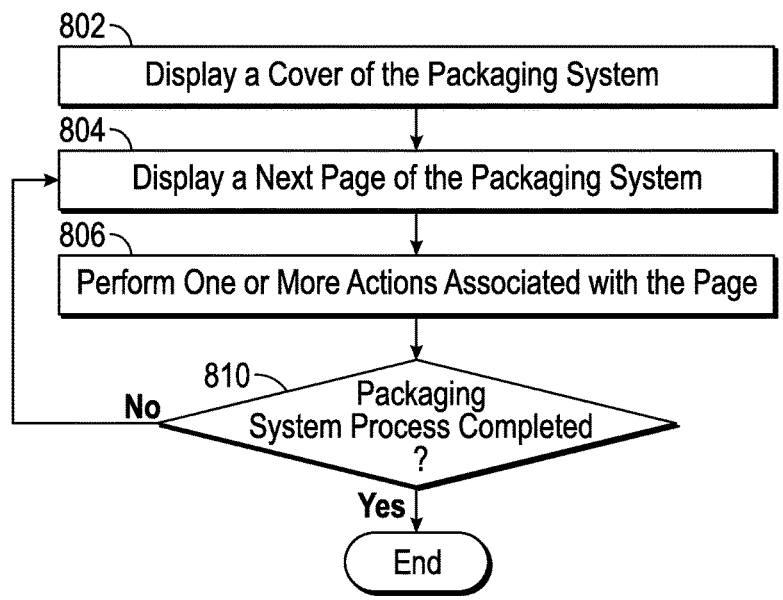
FIG. 8 is a flowchart of a process for utilizing a packaging system in accordance with an illustrative embodiment.

FIG. 8 is a flowchart of a process for utilizing a packaging system in accordance with an illustrative embodiment. The process of FIG. 8 may be implemented by a packaging system, such as the packaging system 100 of FIG. 1. The packaging system may be utilized to transport, display, sell, and store any number of electronic devices. In one embodiment, the packaging system encases, protects, displays, and educates the buyer about wireless earpieces. However, the wireless earpieces may be representative of any number of electronics devices or products purchased or used by users.

The process of FIG. 8 may begin by displaying a cover of the packaging system (step 802). In one embodiment, a default configuration and position of the packaging system may be a closed, configuration in which all pages or components of the packaging system are closed. For example, the pages or opening components of the packaging system may be biased such that they remain closed unless a user applies a force to open or view a page. In one embodiment, the packaging system may be biased by springs integrated in the case of the packaging system. In another embodiment, the packaging system may be grouped or biased together by magnets (or metal) integrated in the cover page and other pages of the packaging system. The cover may be the exterior surface of the packaging system including the applicable information and details for a user. The packaging system may include passive components, active components, or a combination thereof. For example, the packaging system may passively encourage the user to consume content and instructions corresponding to the enclosed electronic device. In another example, the packaging system may actively guide the user.

In one embodiment, the packaging system may act as a spine free book that may be sequential examined (e.g., page by page) to train the user how to use the wireless earpieces. As a result, the wireless earpieces remain protected and secured until the user is able to learn about utilizing the wireless earpieces and the various functionality.

Next, the packaging system displays a next page of the packaging system (step 804). The packaging system may include pages or components that may be turned or opened to display additional content. In one embodiment, the packaging system may present sequential information for training the user how to use the wireless earpieces. For example, the first page may provide information regarding charging the wireless earpieces and turning them on and off. Subsequent pages may provide more details, information, and drawings presenting more information to the user. The pages provide a series of visual and tactile clues for reviewing the information presented by the packaging system.

Next, the packaging system performs one or more actions associated with the page (step 806). In one embodiment, the one or more portions of the packaging system may light up in response to a page being turned. For example, the wireless earpieces may include an LED array that light up. In another embodiment, the packaging system may include a miniaturized speaker that may play audio content to the user associated with the specific page being viewed by the user. This feature may be particularly useful for individuals that are vision impaired. In another embodiment, the user may take an action such as reading information, extracting additional information or documents (e.g., user manual, warranty information, etc.). The user may also interact directly or indirectly with the wireless earpieces. For example, cut-outs or bubbles may allow the user to physically contact the wireless earpieces to perform some various activities (e.g., turn on and off the wireless earpieces lighting them up). The packaging system may also include internal switches including wires for engaging various components of the wireless earpieces. In one embodiment, the packaging system may determine the page accessed by the user utilizing sensors integrated in the pages (e.g., bending sensors, galvanic or touch sensors, optic sensors, etc.). The one or more actions may then be performed based on the accessed page. The one or more actions may include dynamic actions taken by a screen, display, e-ink, or other dynamic display components.

Next, the packaging system determines whether the packaging system process is completed. (step 810). During step 810, the packaging system may determine the page or portion of the packaging system being accessed by the user. In one embodiment, galvanic interfaces may detect contact. Detection of contact may trigger activation of the one or more actions described in step 806. The packaging system may also utilize electronic ink (e.g., black and white or color e-ink) or touch sensitive pages (e.g., pages with wires, conductors, or other sensors integrated) to activate display actions. The display actions may also include changing the text displayed by each page from a first set of content to a second set of content and so forth until all applicable content has been displayed.

In one embodiment, the process is completed if the user has had the opportunity to view or consume all of the pages of the packaging system. For example, if the user has been able to read all of the information on the pages about the functionality and operating the wireless earpieces, the process of FIG. 8 may end. As previously indicated sensor information may indicate the page accessed. The determination of step 810 may be performed continuously based on the user interactions with the packaging system.

If the process has not ended, the packaging system returns to display a next page (step 804).

The illustrative embodiments are not to be limited to the particular examples and embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for providing information through a packaging system, comprising: displaying a cover page of the packaging system wherein the packaging system is in a closed configuration, wherein a display action is associated with the cover page; determining, utilizing logic associated with the packaging system, a first page accessed within the packaging system from a plurality of pages including at least the cover page and the first page, in response to a user turning at least one of the plurality of pages; wherein the packaging system includes an enclosed spine that is integrated with the packaging system such that the packaging system does not appear to have a spine for the plurality of pages while in the closed configuration; automatically performing at least one or more display actions associated with the plurality of pages of the packaging system as determined by the logic in response to a user turning to a next page; and wherein the at least one or more display actions include product instructions and support for using one or more electronic devices.

2. The method of claim 1, further comprising: automatically performing the display action associated with the cover page of the packaging system.

3. The method of claim 1, wherein the packaging system encloses the one or more electronic devices, wherein the packaging system defines a transparent window for viewing the one or more electronic devices from at least the cover page and a plurality of pages including the first page.

4. The method of claim 2, wherein the at least one or more display actions include activating an electronic device enclosed by the packaging system.

5. The method of claim 2, wherein the at least one or more display actions include playing audio content from a speaker of the packaging system.

6. The method of claim 2, wherein the at least one or more display actions include activating one or more lights associated with the packaging system.

7. The method of claim 1, wherein the plurality of pages include magnets for grouping the cover page with the plurality of pages in the closed configuration.

8. The method of claim 1, wherein the at least one or more display actions are performed by an interactive screen of the packaging system.

9. The method of claim 8, wherein the interactive screen includes one of a liquid crystal display, a transparent display, a dual-sided transparent liquid crystal display, and electronic ink.

10. The method of claim 1, wherein the at least one or more display actions are associated with each of the plurality of pages, and wherein the at least one or more display actions are selected by logic of the at least one or more electronic devices enclosed in the packaging system.

11. The method of claim 1, wherein the packaging system is configured to communicate with one or more devices through a transceiver in communication with an Internet connection to perform the display action.

12. The method of claim 1, wherein the at least one or more display actions further include providing registration, warranty, troubleshooting, and product information.

13. A packaging system for one or more electronic devices, comprising:
a case structurally supporting a smart case, the case includes a cover page that opens to a plurality of pages providing information about the one or more electronic devices;
wherein the case includes an enclosed spine integrated with the packaging system that is not visible to a user;
wherein the case further provides product information, instructions and support for using the one or more electronic device; and
the smart case supporting the one or more electronic devices, wherein the case includes a window for viewing the one or more electronic devices and the smart case throughout each of the plurality of pages.

14. The packaging system of claim 13, further comprising:
a speaker powered by a battery of the smart case playing at least the information audibly to a user.

15. The packaging system of claim 13, wherein one or more of the case, the one or more electronic devices, and the smart case include an LED array for guiding a user through the plurality of pages.

16. The packaging system of claim 13, wherein the one or more electronic devices are wireless earpieces, and wherein the wireless earpieces control the information communicated to a user.

17. The packaging system of claim 13 wherein the smart case powers display actions performed by the packaging system until a threshold power level is reached.

* * * * *